(12) United States Patent
Schendel

(10) Patent No.: US 6,287,535 B1
(45) Date of Patent: Sep. 11, 2001

(54) TREATMENT OF COMBUSTIBLE GAS STREAMS

(75) Inventor: Ronald Ludwig Schendel, Manhattan Beach, CA (US)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 09/544,237

(22) Filed: Apr. 7, 2000

Related U.S. Application Data

(63) Continuation of application No. 09/287,897, filed on Apr. 7, 1999, now abandoned.

(51) Int. Cl.$^7$ ............................ C01B 17/04; B01D 53/50; B01D 53/52
(52) U.S. Cl. .................................... 423/573.1; 423/574.1; 423/576.8; 423/DIG. 5
(58) Field of Search .............................. 423/576.8, 574.1, 423/573.1, DIG. 5

(56) References Cited

U.S. PATENT DOCUMENTS

| | | | |
|---|---|---|---|
| 2,945,748 | 7/1960 | Magill | 423/573.1 |
| 3,822,341 | 7/1974 | Smith | 423/574 |
| 3,871,831 | * 3/1975 | Andral et al. | 23/255 R |
| 3,933,992 | * 1/1976 | Andral et al. | 423/573 |
| 4,021,201 | * 5/1977 | Vautrain et al. | 23/253 A |
| 4,100,266 | * 7/1978 | Smith | 423/574 R |
| 5,266,274 | 11/1993 | Taggart et al. | 422/112 |
| 5,486,345 | * 1/1996 | Watson | 423/573.1 |

FOREIGN PATENT DOCUMENTS

| | | |
|---|---|---|
| 328820 A2 | 8/1989 | (EP). |
| 444729 A1 | 9/1991 | (EP). |
| 0242 006 A1 | 10/1997 | (EP). |
| 567480 | * 8/1977 | (SU) ............ 423/DIG. 5 |

* cited by examiner

Primary Examiner—Steven P. Griffin
Assistant Examiner—Timothy C Vanoy
(74) Attorney, Agent, or Firm—Wan Yee Cheung; Salvatore P. Pace

(57) ABSTRACT

A first combustible gas stream containing hydrogen sulphide is subjected to treatment in a first Claus plant including a first thermal Claus stage. Part of the hydrogen sulphide content of a second combustible gas stream containing hydrogen sulphide is burned in at least one further thermal Claus stage. The combustion in the further thermal Clause stage is supported by oxygen-enriched air having an oxygen mole fraction of at least about 0.25 or by oxygen. Resulting sulphur dioxide in the further thermal Clause stage reacts with residual hydrogen sulphide to form sulphur vapour which is condensed out of the effluent gas from the further thermal Claus stage to form a sulphur-depleted effluent gas stream. A first control signal is generated which is a function of the flow rate of the second gas. A second control signal which is a function of the hydrogen sulphide/sulphur dioxide mole ratio in the sulphur-depleted effluent stream is also generated. The control signals are employed in setting the rate at which the combustion-supporting gas is supplied to the second thermal Claus stage.

10 Claims, 3 Drawing Sheets

TREATMENT OF COMBUSTIBLE GAS STREAMS

RELATED APPLICATIONS

This is a continuation of application Ser. No. 09/287,897 filed Apr. 7, 1999 which is abandoned.

BACKGROUND OF THE INVENTION

This invention relates to a method and apparatus for treating combustible gas streams containing hydrogen sulphide.

Hydrogen sulphide containing gas streams (sometimes referred to as "acid gas streams") are typically formed in oil refineries and natural gas processing units. Such streams should not be vented directly to the atmosphere because hydrogen sulphide is poisonous. A conventional method of treating a hydrogen sulphide-containing gas stream (which, if desired, has been pre-concentrated) is by the Claus process. In this process a part of the hydrogen sulphide content of the gas stream is subjected to combustion in a thermal stage taking the form of a furnace so as to form sulphur dioxide. The sulphur dioxide then reacts in the furnace with residual hydrogen sulphide so as to form sulphur vapour. The reaction between hydrogen sulphide and sulphur dioxide does not go to completion. The effluent gas stream from the furnace is cooled and sulphur is extracted, typically by condensation, from the cooled effluent gas stream. The resulting gas stream, still containing residual hydrogen sulphide and sulphur dioxide, passes through a train of stages in which catalysed reaction between the residual hydrogen sulphide and the residual sulphur dioxide takes place. Resulting sulphur vapour is extracted downstream of each stage. The effluent gas from the most downstream of the sulphur extractions may be incinerated or subjected to further treatment, eg by the SCOT or Beavon process, in order to form a gas stream which can be vented safely to the atmosphere.

Air may be used to support the combustion of hydrogen sulphide in the initial part of the process. The stoichiometry of the reactions that take place is such that relatively large volumes of nitrogen (which is, of course, present in the air that supports the combustion) flow through the process and therefore place a ceiling on the rate at which the gas stream containing hydrogen sulphide can be treated in a furnace of a given size. This ceiling can be raised by using commercially produced oxygen or oxygen-enriched air to support the combustion of the hydrogen sulphide.

Generally, depending on the concentration of the hydrogen sulphide containing gas stream, supply of commercially pure oxygen instead of air will result in the creation of excessive temperatures in the furnace which are liable to cause damage, particularly to the refractory lining of the furnace. Various methods are known for increasing the degree of enrichment of the air in oxygen without creating excessive temperatures. For example, United Kingdom Patent Application 2 173 780 A discloses moderating the temperature by introducing liquid water into the flame zone of the furnace. U.S. Pat. No. 5,352,433 discloses a particularly advantageous process in which the capacity or throughput of a Claus process is increased by conducting the combustion of the hydrogen sulphide in two separate furnaces. Accordingly, the overall amount of heat generated by the combustion is allocated between the two furnaces without the need to employ an external or recycled temperature moderator. Thus, a higher degree of uprating can be achieved than in other methods.

Typically, when combustion of the hydrogen sulphide takes place in two separate furnaces, it is possible to operate a process by retro-fitting an additional furnace and appropriate heat exchange equipment to an existing plant.

It is an aim of the present invention to provide a method and apparatus for recovering sulphur from hydrogen sulphide containing gas streams which is flexible to operate, which can be effectively controlled, and which can still offer at least some of the advantages of operation with commercially pure oxygen or oxygen-enriched air.

SUMMARY OF THE INVENTION

According to the present invention there is provided a method of treating a plurality of combustible gas streams containing hydrogen sulphide, comprising the steps of:

(a) operating to recover sulphur from a first combustible gas stream containing hydrogen sulphide, a first Claus plant having a train of stages including, in sequence, a first thermal Claus stage, a first sulphur condenser, and at least one sub-train of stages including a catalytic Claus stage and a second sulphur condenser downstream thereof;

(b) burning in at least one further thermal Claus stage part of the hydrogen sulphide content of a second combustible gas stream;

(c) supplying to the further thermal Claus stage a combustion-supporting gas having an oxygen mole fraction of at least about 0.25 so as to support combustion of hydrogen sulphide therein, the combustion-supporting gas being formed of a stream of pure or impure oxygen separated from air or a mixture of a stream of air with the said stream of pure or impure oxygen;

(d) withdrawing an effluent gas stream containing hydrogen sulphide, sulphur dioxide, water vapour and sulphur vapour from the further thermal Claus stage and removing sulphur vapour from the effluent gas stream in a further sulphur condenser so as to form a sulphur-depleted effluent gas stream;

(e) mixing the sulphur-depleted effluent gas stream with first combustible gas undergoing treatment in the first Claus plant at a region thereof downstream of the first thermal Claus stage and upstream of the start of the catalytic Claus reaction in the said sub-train;

(f) generating a first control signal which is a function of the flow rate into the further thermal Claus stage of one of the second combustible gas and at least one combustible component thereof into the said further thermal Claus stage;

(g) generating a second control signal which is a function of the hydrogen sulphide/sulphur dioxide mole ratio in the said sulphur depleted effluent gas stream; and (h) employing the control signals in setting the rate at which the combustion supporting gas is supplied to the further thermal Claus stage.

The invention also provides plant for treating a plurality of combustible gas streams containing hydrogen sulphide, comprising:

a) a first Claus plant for the recovery of sulphur from a first combustible gas stream containing hydrogen sulphide having a train of stages including, in sequence, a first thermal Claus stage, a first sulphur condenser, and at least one sub-train of stages including a catalytic Claus reaction stage and a second sulphur condenser;

b) at least one further thermal Claus stage for the combustion of part of the hydrogen sulphide content of a second combustible gas stream containing hydrogen sulphide;

c) at least one inlet to the further thermal Claus stage for a combustion-supporting gas having an oxygen mole fraction of at least about 0.25, the combustion-supporting gas being formed of a stream of pure or impure oxygen separated from air or of a mixture of a stream of air with the said stream of pure or impure oxygen;

d) an outlet from the further thermal Claus stage for an effluent gas stream containing hydrogen sulphide, sulphur dioxide, water vapour and sulphur vapour;

e) a further condenser for extracting sulphur vapour from the effluent gas stream, so as to form a sulphur-depleted effluent gas stream having an inlet communicating with the outlet from the further thermal Claus stage;

f) an outlet for the sulphur-depleted effluent gas stream communicating with a region of the first Claus plant downstream of the first thermal Claus stage and upstream of where therein the catalytic Claus reactions starts:

g) means for generating a first control signal which is a function of the flow rate into the said further Claus stage of one of the second combustible gas stream and at least one of the combustible components thereof.

h) means for generating a second control signal which is a function of the mole ratio of hydrogen sulphide to sulphur dioxide in the said sulphur-depleted effluent gas; and i) means responsive to the control signals for setting the rate at which the combustion-supporting gas is supplied to the further thermal Claus reaction stage.

The method and plant according to the invention offer a number of advantages. First, the rate of throughput of combustible gas containing hydrogen sulphide can be substantially greater than in a comparable plant in which the further thermal Claus stage and the further sulphur condenser are omitted. Second, generation of the second control signal which is a function of the ratio of hydrogen sulphide to sulphur dioxide helps achieve stable control of the method and apparatus according to the invention. Third, the further thermal Claus stage and the further sulphur condenser may readily be retro-fitted to a previously standing Claus plant or plants without the need to make substantial alterations to such plant and the process control equipment used therewith. Indeed, the previously standing plants can operate exactly as before the addition of the new equipment. Fourth, the further thermal Claus stage can be employed to supply two or more separate Claus plants with the sulphur-depleted effluent gas mixture.

If the combustion-supporting gas is formed as a mixture of the first stream of air and the second stream of pure or impure oxygen separated from air, the first and second streams may be mixed in situ within the further thermal Claus stage. The mixing need not be perfect. The mole fraction of oxygen in the combustion-supporting gas is preferably at least about 0.7. Supplying such an oxygen-rich combustion supporting gas to a single further thermal Claus stage may tend to cause an excessive temperature, particularly if the second combustible gas mixture containing hydrogen sulphide has a high mole fraction of hydrogen sulphide (eg greater than about 0.7). Such a tendency can be counteracted by supplying to such a single further thermal Claus stage a moderating fluid. This moderating fluid, may, for example, be, liquid carbon dioxide, a recycle stream taken from downstream of the further sulphur condenser or sulphur dioxide taken from a separate source. Preferably, however, two further thermal Claus stages in series are employed so as to limit the amount of combustion of hydrogen sulphide which takes place in each individual stage. There is preferably heat exchange means intermediate the two further thermal Claus stages. Preferably the intermediate heat exchange means is a waste heat boiler. If desired, an intermediate sulphur condenser may be employed downstream of the intermediate heat exchange means but upstream of the more downstream of the two further thermal Claus stages.

The second combustible gas stream may have the same composition as the first combustible gas stream containing hydrogen sulphide or may have a different composition therefrom. For example, the second combustible gas stream may contain ammonia in addition to hydrogen sulphide, whereas the first combustible gas stream may be essentially free of ammonia. The use of a combustion-supporting gas having a mole fraction of say, at least about 0.7 in the further thermal Claus stage or stages makes it possible to create a combustion regimen therein with at least one flame zone with a localised high temperature particularly suitable for the destruction of ammonia.

The sulphur-depleted effluent gas stream is preferably introduced into the first combustible gas mixture at a region of the first Claus plant downstream of the first sulphur condenser and upstream of any reheater forming part of the first or only sub-train of stages. It is, however, possible to conduct the mixing of the two gas streams at a different location. For example, the sulphur-depleted effluent gas stream may be mixed with the first combustible gas stream at a region just upstream of the first sulphur condenser.

The means for generating the first control signal typically comprises a flow meter for measuring the flow rate of the combustion-supporting gas into the said further Claus stage operatively associated with a first valve controller.

The means for generating the second control signal preferably comprise an analyser, typically of the infra-red kind, which is able to measure both hydrogen sulphide and sulphur dioxide concentrations, and means for computing the mole ratio of hydrogen sulphide to sulphur dioxide and means for comparing the computed mole ratio of hydrogen sulphide to sulphur dioxide with a pre-set desired ratio. Any difference therebetween is employed as the second control signal to adjust flow of the combustion-supporting gas to the further thermal Claus stage or stages. Preferably, the rate at which the combustion-supporting gas is supplied to the further thermal Claus stage or stages is primarily controlled by the means for generating the first control signal. To this end at least a major or main part of the total flow of the combustion-supporting gas passes through at least one first main flow control valve operatively associated with the means for generating the first control signal. If the combustion-supporting gas is a stream of pure or impure oxygen separated from air, there can be a single first main flow control valve. If, on the other hand, the combustion-supporting gas is formed of a mixture of a stream of air with a stream of pure or impure oxygen separated from air, there can be a first main flow control valve located in a first conduit for the air stream and a second main flow control valve located in a second conduit for the oxygen stream. If desired, the primary control can be enhanced by analysis of the second combustible gas stream. The second control signal provides a fine tuning to the primary control of the flow rate of the combustion-supporting gas to the further thermal Claus stage or stages. To this end, there is preferably at least one secondary (or trim) control valve in parallel with the or each main control valve, the secondary control valve being operatively associated with the means for generating the second control signal. Typically, only a minor part of the combustion-supporting gas flows through the or each secondary control valve. Any one of a number of different variants of this control strategy may be adopted depending on whether the combustion-supporting gas is supplied in a single stream or a plurality of streams to the further thermal Claus stage or stages. If such supply is in the form of a single stream, there may be a single main control valve and a part of the steam may bypass the main control valve and flow through the secondary control valve. Alternatively, if the combustion-supporting gas is supplied in plurality of streams, each stream may have its own main control valve, and at least one of the streams may bypass its associated main control valve by flowing through the secondary control valve.

Alternative control strategies with the first and second control signals may be used. For example, there may be a single control valve and control apparatus having a set point, the second control signal being used to reset this point. In another alternative there may be one conduit for supplying air to the further thermal Claus stage and another conduit for supplying pure or impure oxygen thereto, a main flow control valve in each conduit and the means for generating the second control signal may be arranged so as to get either main flow control valve. In general, it is preferred to use a second or trim valve because difficulties can arise in achieving fine control with minor adjustments to a single, relatively large, control valve.

Preferably, there is a similar arrangement of flow control valves to control the flow of air or oxygen-enriched air to the thermal Claus stage of the first Claus plant. Thus, one flow control valve through which passes a minor part of the total air or oxygen-enriched air flow to the first thermal Claus stage preferably responds to signals generated by an analyser having a sensor or sensors located downstream of all the sub-trains while another flow control valve through which passes the main flow of air or oxygen-enriched air is preferably set in accordance with the expected flow of first combustible gas to the first Claus plant and may be adjusted in response to any sensed deviation from a specified flow and/or specified mole fraction of hydrogen sulphide.

Preferably, the method according to the invention includes operation of at least one second Claus plant for the recovery of sulphur from at least one third combustible gas stream containing hydrogen sulphide having a train of stages including in sequence, a first thermal Claus stage, a first sulphur condenser, and at least one sub-train of stages including a catalytic Claus reaction stage and a second sulphur condenser. During normal operation, only part of the sulphur-depleted effluent gas stream is mixed with the first combustible gas stream, the remainder of the sulphur-depleted effluent gas stream being mixed with the third combustible gas stream at a region downstream of the first thermal Claus stage thereof and upstream of the start of catalytic Claus reaction therein.

One advantage of this arrangement is that production of the sulphur may continue when any one of the first Claus plant, the second Claus plant, and the further thermal Claus stage is shut down for routine maintenance.

BRIEF DESCRIPTION OF THE DRAWINGS

The method and plant according to the invention will now be described by way of example with reference to the accompanying drawings, by which

The drawings are not to scale. For purposes of ease of illustration, various flow control valves and shut-off valves and other equipment have been omitted from the drawings. Like parts shown in two or more of the drawings are indicated by the same reference number.

DETAILED DESCRIPTION

Figure 1:
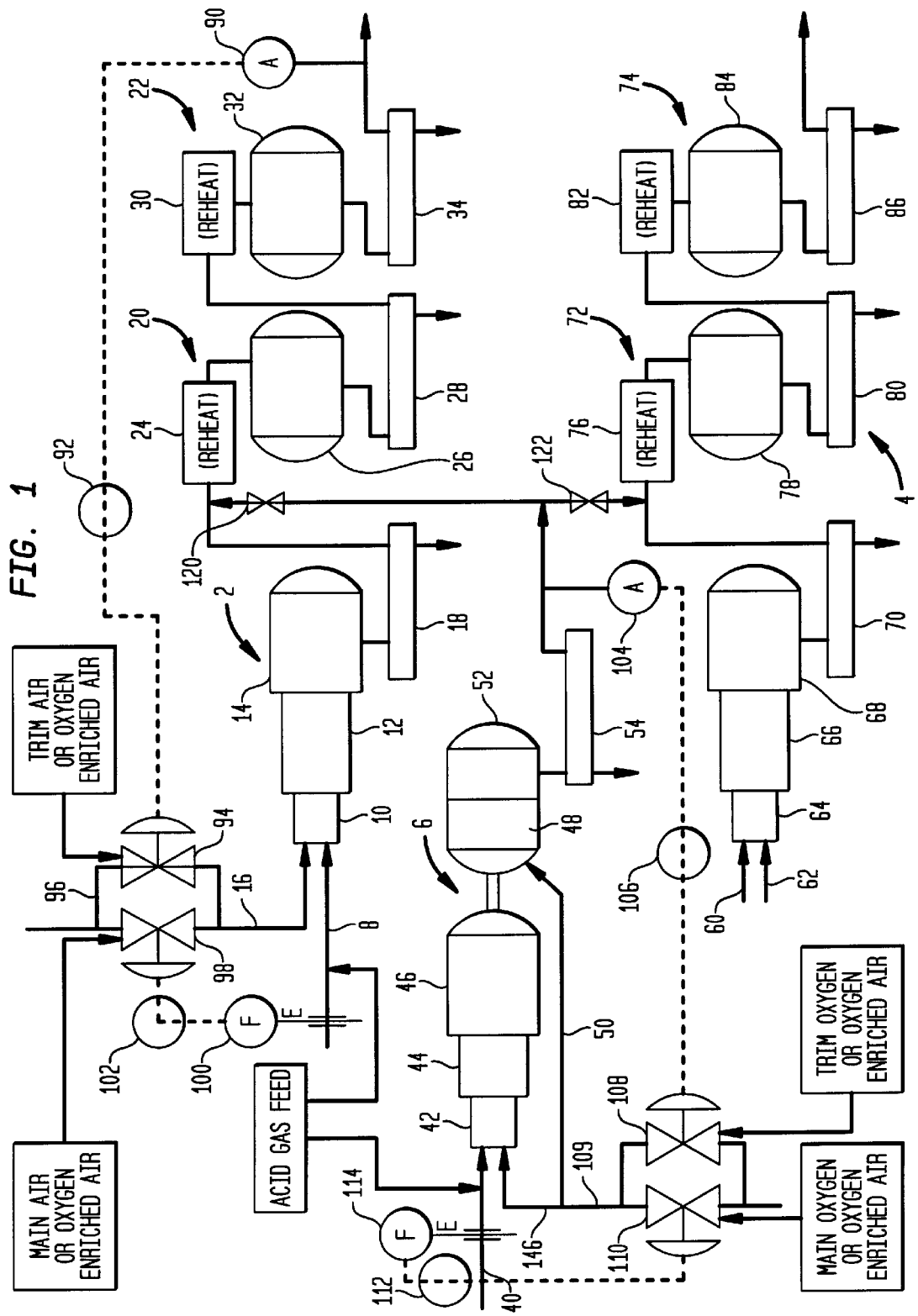
FIGS. 1 to 3 are respectively schematic flow diagrams of a first, a second, and a third example of plant for treating a plurality of combustible gas streams containing hydrogen sulphide.

In FIG. 1 of the drawings, there is illustrated a first Claus plant 2, a second Claus plant 4, and further equipment 6 for the recovery of sulphur from a hydrogen sulphide containing gas stream. A first combustible gas stream containing hydrogen sulphide is introduced into the first Claus plant 2 through a pipeline 8. In an oil refinery, the source of the first combustible gas stream containing hydrogen sulphide may be a source of so-called "amine gas" which typically contains over 80% by volume of hydrogen sulphide (with most of the balance being carbon dioxide) or a source of so-called "sour water stripper gas" which typically contains about 20 to about 35% by volume of hydrogen sulphide and about 30 to about 45% by volume of ammonia, with the balance including water vapour and carbon dioxide. In another example the first combustible gas stream containing hydrogen sulphide is a mixture of sour water stripper gas and amine gas.

The first combustible gas mixture containing hydrogen sulphide flows from the pipeline 8 into a burner 10 which may be of an axial or tangential tip-mixed kind firing into a furnace 12 which constitutes the thermal stage of the Claus plant. In order to support combustion of the combustible components of the first gas mixture containing hydrogen sulphide, a stream of air or oxygen-enriched air is fed through a pipeline 16 to the burner 10. The relative rates of flow of the air or oxygen-enriched air and the first combustible gas stream containing hydrogen sulphide are such that the burner 10 receives approximately 2 moles of hydrogen sulphide for each mole of oxygen. Accordingly, sufficient oxygen is supplied to support the combustion of about one third of the total rate of flow of hydrogen sulphide molecules into the burner 10. Sufficient additional oxygen molecules are also supplied to ensure the total combustion of any ammonia or hydrocarbons present in the first combustible gas mixture containing hydrogen sulphide.

The combustion of hydrogen sulphide in the furnace 12 forms water vapour and sulphur dioxide. Resulting sulphur dioxide reacts within the furnace 12 with residual hydrogen sulphide to form sulphur vapour and further water vapour. Other chemical reactions also take place. For example, some thermal dissociation of hydrogen sulphide into hydrogen and sulphur also occurs. Various other reactions take place depending on the particular operating conditions in the furnace 12. For example, carbon monoxide (itself formed by thermal dissociation of carbon dioxide or by reaction of carbon dioxide with hydrogen sulphide) reacts with sulphur vapour to form carbon oxysulphide. Carbon disulphide may also be formed.

A gas mixture containing hydrogen sulphide, sulphur dioxide, sulphur vapour, water vapour, carbon dioxide, hydrogen and carbon monoxide and also including traces of carbon oxysulphide and carbon disulphide flows out of the furnace 12 into a waste heat boiler 14 in which it is cooled typically to a temperature in the range of about 250 to about 350° C. The thus cooled gas mixture flows from the waste heat boiler 14 into a sulphur condenser in which it is further cooled typically to a temperature in the range of about 110 to about 180° C. The sulphur condenser 18 also condenses at least some of the sulphur vapour in the gas mixture. The resulting condensate is passed to a sulphur seal pit not shown.

Because the Claus reaction between hydrogen sulphide and sulphur dioxide does not go to completion, the gas mixture leaving the condenser 18 contains appreciable proportions of sulphur dioxide and hydrogen sulphide. In order to extract further sulphur therefrom, the gas mixture is passed through a first sub-train 20 of stages including catalytic Claus reaction between the hydrogen sulphide and the sulphur dioxide and a second similar sub-train 22 of stages including catalytic reaction between hydrogen sulphide and sulphur dioxide. The sub-train 20 has, in sequence, a reheater 24 which the gas mixture to a temperature typically in the range of about 200 to about 250° C. From the reheater 24 the gas mixture passes through a first catalytic Claus reactor 26 in which reaction takes place between the hydrogen sulphide and sulphur dioxide over a catalyst, for example, activated alumina. As a result, further sulphur vapour and water vapour is formed. The resulting gas mixture flows out of the catalytic reactor 26 into another sulphur condenser 28 in which it is cooled to a temperature typically in the range of about 110 to about 150° C. and the sulphur vapour formed in the catalytic reactor is condensed. The resulting condensate is passed to a sulphur seal pit (not shown). The sulphur-depleted gas mixture passes to the second train 22. The second train consists of, in sequence, a further reheater 30, a further catalytic Claus reactor 32 and a yet further sulphur condenser 34. The operation of these units is analogous to that of the respective units in the first train 20.

The gas mixture leaving the yet further sulphur condenser 34 may, depending on its concentration of residual sulphur compounds, be sent to an incinerator (not shown) and discharged to the atmosphere. Alternatively, the gas mixture may pass to a hydrolysis reactor (not shown) in which the components present in the gas mixture are subjected to hydrolysis and hydrogenation. In the hydrolysis reactor, residual carbon oxysulphide and carbon disulphide are hydrolysed with water vapour to produce hydrogen sulphide over a catalyst, for example alumina impregnated with cobalt and molybdenum. Such catalysts are well known in the art. At the same time, residual elemental sulphur and sulphur dioxide are hydrogenated to form sulphur dioxide. The hydrolysis and hydrogenation take place over the aforesaid impregnated alumina catalyst at a temperature typically in the range of about 300 to about 350° C. A resulting gas mixture consisting essentially of hydrogen sulphide, nitrogen, carbon dioxide, water vapour and hydrogen leaves the hydrolysis reactor and flows first to a water condensation unit (not shown) and then to a separate unit (not shown) in which hydrogen sulphide is separated, for example by chemical absorption. A suitable chemical absorbent is methyl diethylamine. If desired the hydrogen sulphide so recovered may be recycled to the burner 10.

A second combustible gas stream containing hydrogen sulphide is sent to the further equipment 6. The second combustible gas stream may have the same or a different composition from the first combustible gas stream. If there are separate sources of amine gas and sour water stripper gas, and if air ( not enriched in oxygen) is employed to support combustion within the furnace 12 of the first Claus plant 2, it is generally preferred that the amine gas be sent to the first Claus plant 2 and the sour water stripper gas be sent to the further equipment 6.

The second combustible gas stream containing hydrogen sulphide flows through a pipeline 40 to a burner 42 which fires axially or tangentially into a furnace 44 15 constituting a thermal Claus stage. A combustion supporting gas preferably having a mole fraction of oxygen of at least about 0.8 is supplied to the burner 42 through a pipeline 46 in order to support combustion of the combustible components of the second combustible gas stream containing hydrogen sulphide. The burner 42 may be of a tip-mixed kind. The combustion-supporting gas is preferably commercial pure oxygen or oxygen-enriched air. The respective rates of flow of the gas streams to the burner 42 are selected such that in operation the refractory lining (not shown) of the furnace 44 never acquires a temperature of about 1650° C. or higher. Generally, the rate of supply of the combustion supporting gas is therefore appreciably less than that required for combustion of one third of the hydrogen sulphide content of the second combustible gas stream.

The reactions that take place within the furnace 44 are essentially the same as those described above in respect of the furnace 12 of the first Claus plant 2. The use of a combustion-supporting gas having a mole fraction of oxygen of at least about 0.8 does, however, tend to facilitate the thermal dissociation of hydrogen sulphide. Typically, therefore, the proportion of hydrogen in the resulting gas is greater than that in the corresponding part of the first Claus plant 2. Effluent gas stream 44 containing hydrogen sulphide, sulphur dioxide, sulphur vapour, water vapour, hydrogen, and carbon dioxide, and typically nitrogen, carbon monoxide, and traces of carbon oxy-sulphide and carbon disulphide leaves the furnace 44 and passes into a waste heat boiler 46 in which it is cooled typically to a temperature in the range of about 500 to about 600° C.

The resulting cooled effluent gas stream flows into a second Claus furnace 48. Further combustion-supporting gas is supplied to the furnace 48 via a pipeline 50 which branches from the pipeline 46. The combustion supporting gas enters the furnace 48 via lances (not shown)

As a result, combustion of a part of the hydrogen sulphide content of the cooled effluent gas stream from the furnace 44 takes place. Since the effluent gas stream typically leaves the waste heat boiler 46 at a relatively high temperature, combustion of the hydrogen sulphide readily takes place.

The relative rates of flow of hydrogen sulphide molecules and oxygen molecules into the furnaces 44 and 48 are arranged to be such that the mole ratio of hydrogen sulphide to sulphur dioxide in the effluent gas stream leaving the furnace 48 is typically in the range of about 1.5:1 to about 3:1. The effluent gas mixture is cooled in a further waste heat boiler 52 typically to a temperature in the range of about 250 to about 350° C. The cooled effluent gas mixture containing the same species as the gas mixture leaving the waste heat boiler 46 (but in different proportions) now flows into a sulphur condenser 54 in which it is further cooled to a temperature of about 110 to about 150° C. and in which at least some of the sulphur vapour is condensed. The resulting condensate is sent to the sulphur seal pit (not shown). The resulting sulphur-depleted effluent gas stream is typically divided into two subsidiary gas streams. One subsidiary gas stream is united with the gas flow through of the first Claus plant 2 at a region downstream of the condenser 18 but upstream of the reheater 24. The other part of the sulphur-depleted effluent gas stream passing out of the sulphur condenser 54 is used in a manner which shall be described below.

A third combustible gas stream containing hydrogen sulphide is passed into the second Claus plant 4 through a pipeline 60. Air or oxygen-enriched air is passed into the third Claus plant 4 through a pipeline 62. The second Claus plant 4 comprises a burner 64 which fires into a furnace 66 constituting a thermal Claus stage. Effluent gas leaving the furnace 66 is cooled in a waste heat boiler 68. Sulphur is condensed in a sulphur condenser 70 from the cooled effluent gas stream and the resulting condensate is passed to a sulphur seal pit (not shown). The sulphur-depleted gas mixture leaving the condenser 70 flows to a sequence of two sub-trains 72 and 74 of catalytic Claus stages. The upstream train 72 comprises, in sequence, a reheater 76, a first catalytic Claus reactor 78, and a sulphur condenser 80. The second sub-train 74 similarly comprises a reheater 82, a catalytic Claus reactor 84 and a sulphur condenser 86. The operation of the second Claus plant 4 is analogous to that of the first Claus plant 2 and shall not be described further herein save to state that the other part of the sulphur-depleted effluent gas from the sulphur condenser 54 of the further equipment 6 is introduced into the gas mixture passing through the Claus plant 4 downstream of the condenser 70 but upstream of the reheater 76.

The provision of the further equipment 6 enables the overall capacity of the two Claus plants to be increased. By employing in the further equipment 6 a combustion-supporting gas richer in oxygen than that used in the Claus plants 2 and 4, it is possible to keep down the additional quantities of non-reacting gases particularly nitrogen and carbon dioxide. The further equipment 6 may typically be retro-fitted to the Claus plants 2 and 4. By processing more feed through the further equipment, and less feed through the thermal stages of the Claus plants 2 and 4 the total feed rate can be increased while maintaining a relatively unaltered flow through the catalytic stages of the Claus plants 2 and 4.

In accordance with the invention, control is exerted such that the addition of the sulphur-depleted effluent gas mixture containing hydrogen sulphide and sulphur dioxide from the further equipment to the catalytic stages of the Claus plants 2 and 4 does not upset their operation. FIG. 1 of the drawings illustrates a control scheme for the first Claus plant 2. An analyser 90 is positioned downstream of the condenser 34 and generates a control signal which is transmitted to a valve controller 92 which compares the actual mole ratio of hydrogen sulphide to sulphur dioxide (or a function thereof) with a pre-set value of such ratio (or function of such ratio). If there a difference between the two values, a trim valve 94 is reset so as to adjust the flow of air or oxygen-enriched air through a trim pipeline 96 to the pipeline 16 so as to bring the sensed value of the hydrogen sulphide to sulphur dioxide mole ratio back to the pre-set value.

The trim pipeline 96 carries but a small proportion of the total flow of the oxygen-enriched air to the pipeline 16 of the Claus plant 2. There is a main flow control valve 98 in parallel with the trim valve 94. This valve may be set according to the calculated flow of air or oxygen-enriched air required completely to oxidise any ammonia and hydrocarbons present in the first combustible gas stream and to oxidise a chosen proportion of its hydrogen sulphide content to sulphur dioxide and water vapour. A flow meter 100 which measures the flow rate of the first combustible gas stream into the first Claus plant 2 and generates a signal to a valve representative of the flow rate which is transmitted to a valve controller so as to reset the main flow control valve 98 in the event of the measured flow rate varying from that specified. The control scheme may be based on a composition of the first combustible gas stream which is assumed from past experience or past analysis, or the composition may be determined by an on-stream analyser or analysers (not shown) which generate an auxiliary control signal. The arrangement of controls described above is able to afford stable operation of the first Claus plant 2 when the Claus plant 2 is operated without addition of sulphur-depleted effluent gas from the sulphur condenser 54 of the further equipment 6.

When the further equipment 6 is operated. The main part of the oxygen or oxygen-enriched air flow to the pipeline 46 passes through a main flow control valve 110. The flow rate of the second combustible gas stream is measured by a flow meter 114 which transmits to a valve controller 112 a signal representative of the flow rate of the second combustible stream. The valve controller 112 generates a first control signal which determines the position of the main flow control valve with the result that the rate of supply of the oxygen or oxygen-enriched air to the further equipment 6 is automatically adjusted in accordance with any variation in the rate at which the second combustible gas stream is supplied. An analyser 104 is positioned so as to be able to measure both the hydrogen sulphide to sulphur dioxide concentration in the sulphur-depleted effluent gas stream immediately downstream of the sulphur condenser 54. The analyser 104 transmits to a valve controller 106 a signal which is representative of the mole ratio of hydrogen sulphide to sulphur dioxide. The valve controller generates a second control signal to a "trim" flow control valve 108 in a pipeline 109. The trim flow control valve 108 is able to respond to the second control signal to make small adjustments to the total flow rate of oxygen or oxygen-enriched air to the further equipment 6 such that the mole ratio of hydrogen sulphide to sulphur dioxide is maintained at a chosen value in the sulphur-depleted effluent gas.

As a result satisfactory operation of the catalytic Claus stages is maintained and that the proportion of sulphur compounds in the tail gas leaving the sulphur condenser 34 associated with the catalytic Claus reactor 32 does not exceed a specified maximum. If there is any deviation from the desired mole ratio, the analyser will be able to detect this and adjust the trim valve 94 associated with the first Claus plant 2 accordingly. In view of the relatively high concentrations of sulphur dioxide and hydrogen sulphide in the sulphur-depleted effluent gas stream leaving the sulphur condenser 54, in the absence of the analyser 104 and the valve controller 106, stable operation of the overall plant would be difficult to achieve.

Typically, additional flow control valves 120 and 122 are provided so as to enable the sulphur-depleted effluent gas stream leaving the condenser 54 to be appropriately proportioned between the first Claus plant 2 and the second Claus plant 4. Although not shown the second Claus plant 4 has associated with it valve control equipment analogous to that associated with the Claus plant 2.

Various changes and modifications may be made to the plants and equipment shown in FIG. 1 of the drawings. For example, an intermediate sulphur condenser (not shown) may be installed intermediate the waste heat boiler 46 and the second thermal Claus stage 48 of the additional equipment 6 and the waste heat boiler 46 operated to cool the gas mixture passing therethrough to a lower temperature. In another example air and oxygen are fed separately to the further equipment 6, the control signal from the analyser can be used to control a trim valve associated with either the air supply line or the oxygen supply line.

Figure 2:
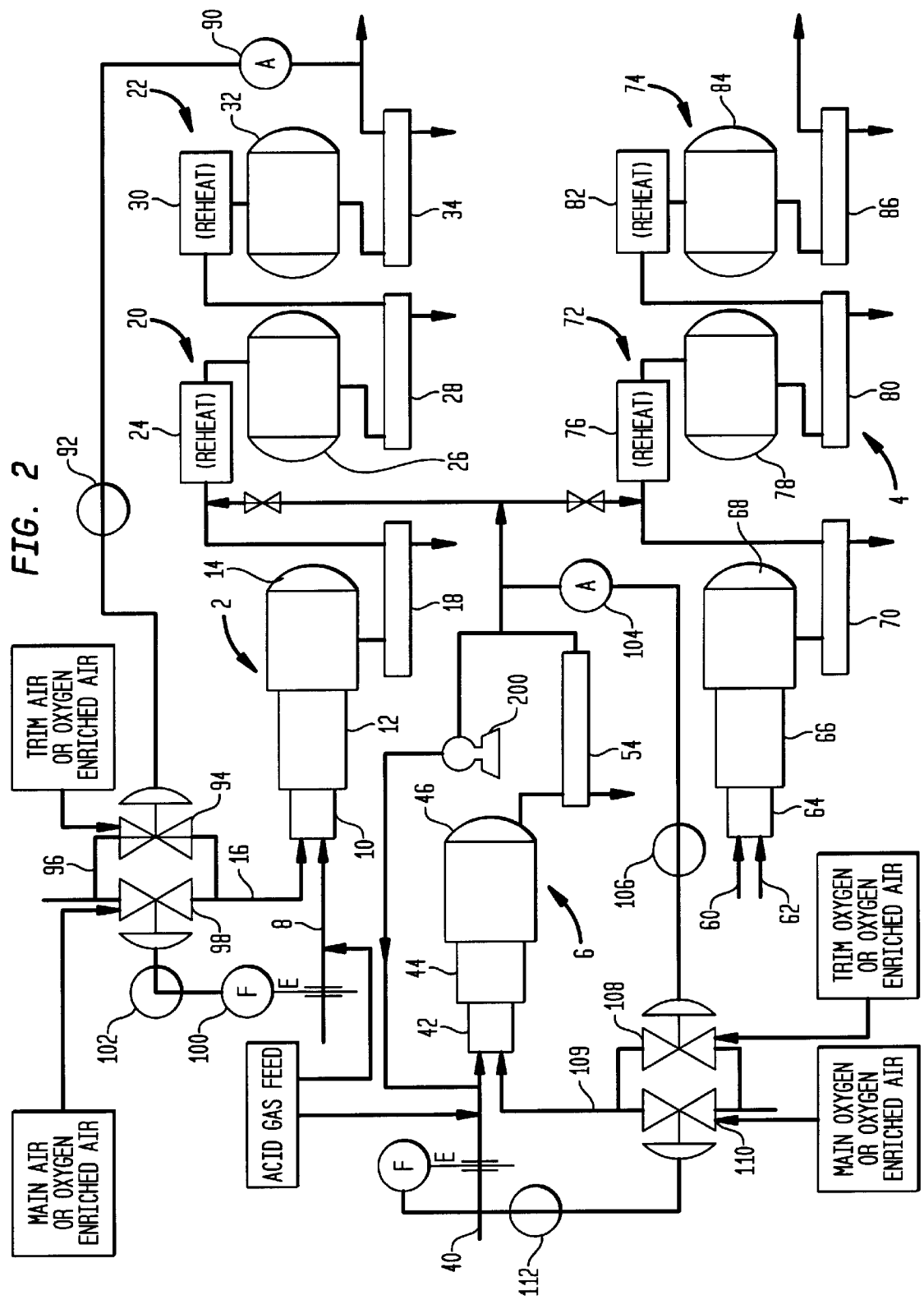

FIG. 2 illustrates another modification in which the second thermal Claus stage 48 and its associated waste heat boiler 52 are omitted from the additional equipment 6. Instead, part of the sulphur-depleted effluent gas stream leaving the sulphur condenser 54 is recycled by a pump 200 to the second combustible gas mixture containing hydrogen sulphide. The recycled gas stream modifies the temperature which would otherwise be created within the first Claus furnace 44 and thereby enables a combustion supporting gas with a higher mole fraction of oxygen to be used than would otherwise be possible. Again, the waste heat boiler 46 is operated at a lower temperature than in the equipment shown in FIG. 1. In other respects, the plants and equipment shown in FIG. 2 are analogous to those shown in FIG. 1.

Figure 3:
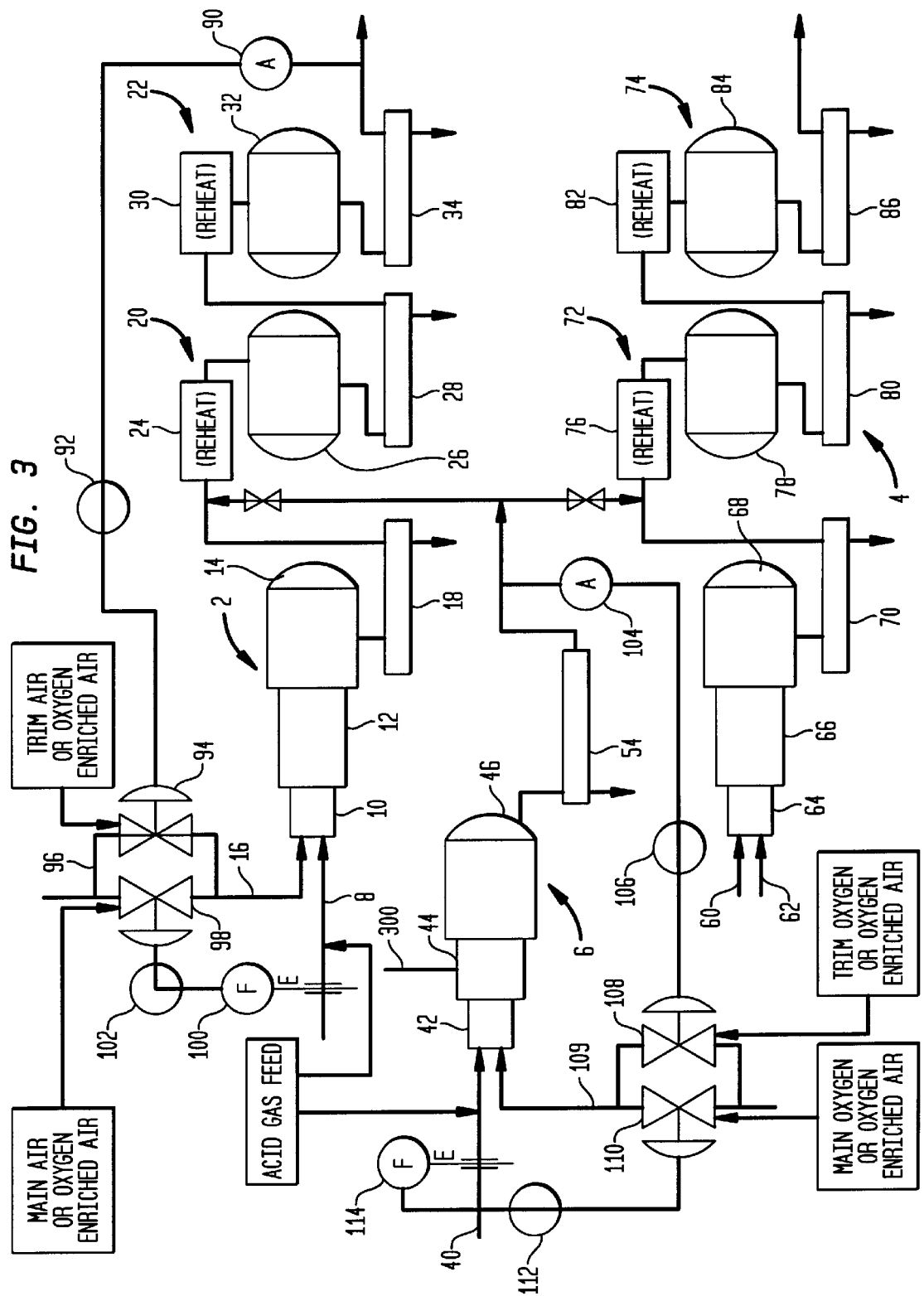

Referring now to FIG. 3, a further modification is shown in which again the second Claus furnace 48 and the waste heat boiler 52 of the additional equipment 6 shown in FIG. 1 are omitted. In this case moderation of the temperature in a first furnace 44 is achieved by direct injection of a fluid such as liquid water through a pipe 300 into the flame zone (not shown) within the furnace 44.

What is claimed is:

1. A method of treating a plurality of combustible gas streams containing hydrogen sulphide, comprising the steps of:

(a) operating to recover sulphur from a first combustible gas stream containing hydrogen sulphide, a first Claus plant having a train of stages including, in sequence, a first thermal Claus stage, a first sulphur condenser, and at least one sub-train of stages including a catalytic Claus stage and a second sulphur condenser downstream thereof;

(b) burning in at least one further thermal Claus stage part of the hydrogen sulphide content of a second combustible gas stream containing hydrogen sulphide;

(c) supplying to the further thermal Claus stage a combustion-supporting gas having an oxygen mole fraction of at least about 0.25 so as to support combustion of hydrogen sulphide therein, the combustion-supporting gas being formed of a stream of pure or impure oxygen separated from air or of a mixture of a stream of air with the stream of pure or impure oxygen;

(d) withdrawing an effluent gas stream containing hydrogen sulphide, sulphur dioxide, water vapour and sulphur vapour from the further thermal Claus stage and removing sulphur vapour from the effluent gas stream in a further sulphur condenser so as to form a sulphur-depleted effluent gas stream;

(e) mixing at least part of the sulphur-depleted effluent gas stream with first combustible gas undergoing treatment in the first Claus plant at a region thereof downstream of the first thermal Claus stage and upstream of the start of the catalytic Claus reaction in the sub-train;

(f) generating a first control signal which is a function of a flow rate into the further thermal Claus stage, the flow rate being selected from the group consisting of a flow rate of the second combustible gas and a flow rate of at least one combustible component of the second combustible gas;

(g) generating a second control signal which is a function of the hydrogen sulphide/sulphur dioxide mole ratio in the sulphur depleted effluent gas stream; and (h) employing the control signals in setting a rate at which the combustion supporting gas is supplied to the further thermal Claus stage.

2. The method according to claim 1, in which the mixture of the stream of air with the stream of pure or impure oxygen is formed in the further thermal Claus stage.

3. The method according to claim 1, in which the said combustion-supporting gas has a mole fraction of oxygen of about 0.7.

4. The method according to claim 1, in which there is a single further thermal Claus stage.

5. The method according to claim 4, a temperature moderating fluid selected from liquid water, liquid carbon dioxide, sulphur dioxide and a recycle stream taken from downstream of the further sulphur condenser is supplied to the single further thermal Claus stage.

6. The method according to claim 1, in which there are two further thermal Claus stages in series with heat exchange means therebetween.

7. The method according to claim 1, in which the sulphur-depleted effluent gas stream is introduced into the first combustible gas undergoing treatment in the first Claus plant at a region thereof downstream of the first sulphur condenser.

8. The method according to claim 1, in which a main part of the flow of the combustion-supporting gas passes through at least one main flow control valve and a minor part of the said flow passes through a trim flow control valve, and the first and second control signals are used to adjust the positions of the main and trim flow control valves respectively.

9. The method according to claim 1, additionally including operating a second Claus plant for the recovery of sulphur from a third combustible gas stream containing hydrogen sulphide having a train of stages including, in sequence, a first thermal Claus stage, a first sulphur condenser, and at least one sub-train of stages including a catalytic Claus reaction stage and a second sulphur condenser.

10. The method according to claim 9, in which only part of the said sulphur-depleted effluent gas stream is mixed with the said first combustible gas stream, the remainder of the sulphur-depleted effluent gas stream being mixed with the third combustible gas stream undergoing treatment in the second Claus plant at a region thereof downstream of the first thermal Claus stage thereof and upstream of the start of catalytic Claus reaction therein.

* * * * *